United States Patent [19]

Hallstrom et al.

[11] 4,169,906

[45] Oct. 2, 1979

[54] WEAR RESISTANT COATED PIPE AND METHOD OF MAKING IT

[75] Inventors: James R. Hallstrom, Brookfield; Kenneth G. Klatt, Brown Deer; Ronald L. Walling, Sussex, all of Wis.

[73] Assignee: Rexnord Inc., Milwaukee, Wis.

[21] Appl. No.: 894,113

[22] Filed: Apr. 6, 1978

Related U.S. Application Data

[63] Continuation of Ser. No. 613,292, Sep. 15, 1975, abandoned.

[51] Int. Cl.[2] .......................... B05D 7/22; B05D 3/02

[52] U.S. Cl. .................................... 427/183; 427/202; 427/204; 427/205; 427/233; 427/234; 427/236; 427/240; 427/425; 138/145

[58] Field of Search ...................... 138/145, 146, 177; 427/240, 241, 181, 183, 234, 202, 204, 205, 233, 236, 425

[56] References Cited

U.S. PATENT DOCUMENTS

| | | | |
|---|---|---|---|
| Re. 24,187 | 7/1956 | Burwell | 427/240 X |
| 1,949,433 | 3/1934 | Russell et al. | 427/241 X |
| 2,066,592 | 1/1937 | Wadsworth | 427/240 X |
| 2,319,657 | 5/1943 | Brown | 427/241 X |
| 2,619,430 | 11/1952 | Fink | 427/426 X |
| 2,623,809 | 12/1952 | Myers | 427/240 X |
| 2,962,052 | 11/1960 | Sergovic | 138/145 |
| 3,177,902 | 4/1965 | Rubenstein | 138/145 |
| 3,278,324 | 10/1960 | Nelson | 427/183 |
| 3,462,083 | 8/1969 | Kautz | 427/426 X |
| 3,563,791 | 2/1971 | Janco | 427/240 X |
| 3,804,663 | 4/1974 | Clark | 427/240 X |

*Primary Examiner*—Harry N. Haroian
*Attorney, Agent, or Firm*—Kinzer, Plyer, Dorn & McEachran

[57] ABSTRACT

This is concerned with a method of making a pipe to increase its wear resistance by coating the interior thereof with a wear resistant coating which includes wear resistant particles, and the pipe produced by such a method.

7 Claims, 4 Drawing Figures

10
12

14
34
10
12
30
31
28
16
26
32
24

10
12
26
28
31
32
24
16

22
20
18
10
38
36

WEAR RESISTANT COATED PIPE AND METHOD OF MAKING IT

This is a continuation of application Ser. No. 613,292, filed Sept. 15, 1975, now abandoned.

SUMMARY OF THE INVENTION

This invention is concerned with a wear-resistant coated pipe and a method of making it which is basically intended to be used for the transmission of abrasive and corrosive mixtures, fluids, slurries and the like.

A primary object of the invention is a method of making a coated pipe so that its wear resistance will approach or match the abrasiveness and hardness of the fluid or material the pipe is to conduct.

Another object is a method of coating the inside of a pipe to substantially increase its wear resistance.

Another object is a coating composition for the inside of a pipe which is easy to apply and greatly increases the life of the pipe.

Another object is a method of making a wear-resistant pipe where a wear-resistant coating may be applied to the interior thereof in one or multiple layers while the pipe is being rotated.

Another object is a pipe coating method which does not require excessive speeds of rotation of the pipe while it is being coated.

Another object is a pipe of the above type which is constructed to handle or convey quite abrasive substances, for example coal slurries, gold slurries, etc.

Another object is a pipe of the above type which, as compared to previous wear-resistant pipes, is much lighter.

Other objects will appear from time to time in the ensuing specification and drawings.

DESCRIPTION OF THE PREFERRED EMBODIMENTS

Figures 1, 2, 3, 4:
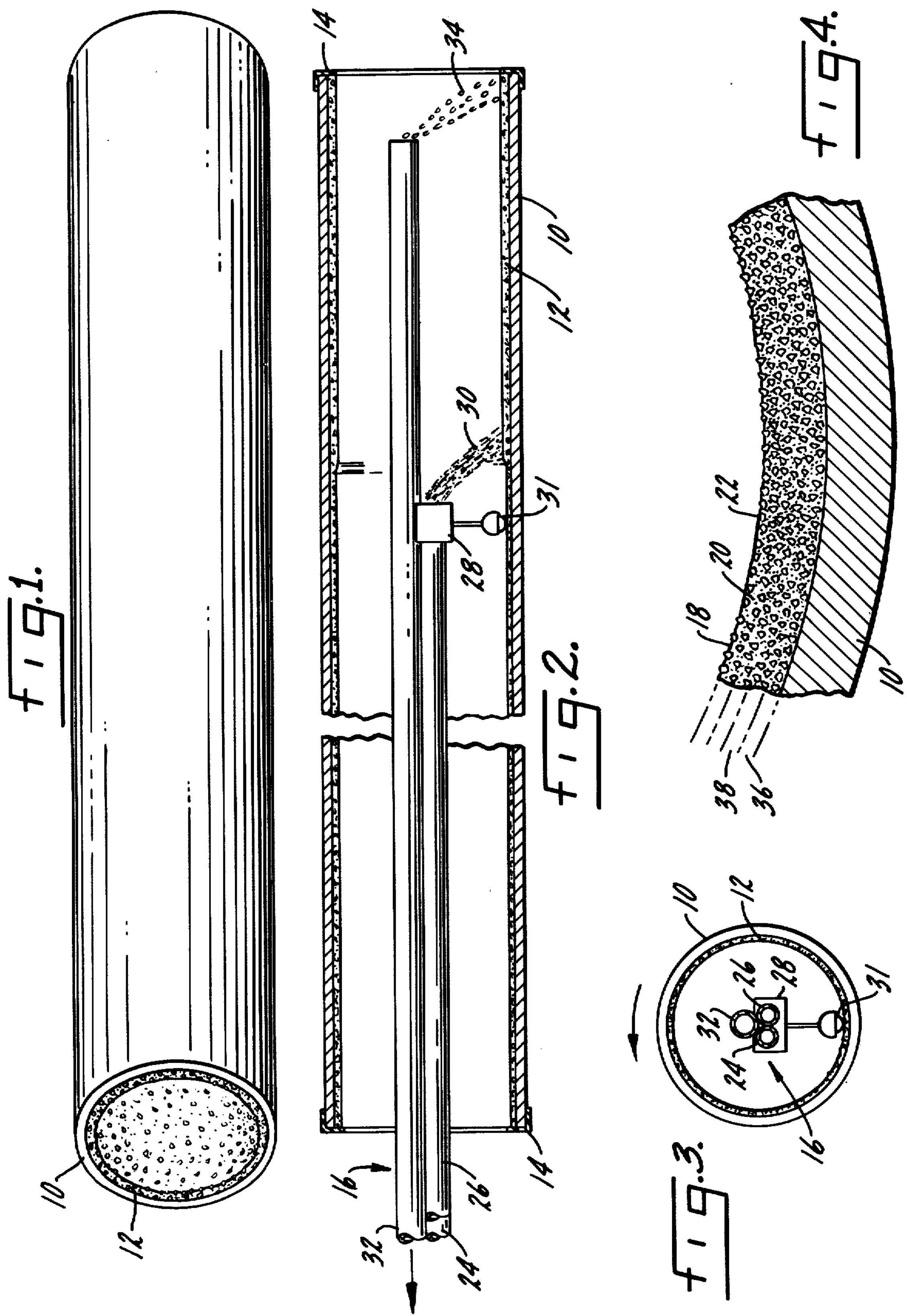
FIG. 1 is a perspective of a coated pipe.
FIG. 2 is an axial section, with parts in full, schematically indicating the method.
FIG. 3 is an end view, from the left in FIG. 2.
FIG. 4 is an enlarged section of a segment of the pipe.

In FIG. 1 a pipe has been indicated generally at 10 and is shown with an interior coating or lining 12. The pipe 10 may be metal, such as steel, aluminum, copper, brass, bronze, cast iron, etc. Or it might be a plastic or combination, for example fiber glass or a concrete. The coating or lining 12 is of a particular character and composition and includes or comprises a matrix or base material which may be a plastic and certain types of wear-resistant fillers or components, explained in detail hereinafter.

The process of coating the pipe includes disposing the pipe itself, whatever its material or composition, in a generally horizontal plane and rotating it at a certain rate of speed about a generally horizontal axis. As it is rotated the coating material is applied or distributed around the inside, as schematically indicated in FIG. 2, in a certain manner to achieve a certain purpose. In FIG. 2 end caps 14 are shown diagrammatically positioned on the ends of the pipe to provide circumferential dams at each end so that the coating material and its various ingredients will not flow out one end or the other. The lip or dam on these caps or rings can be of any suitable radial extent. A filling or coat-applying instrumentality is indicated diagrammatically at 16 and its makeup will be explained in detail hereinafter. Suffice it to say at this point that the wear-resistant coat is applied in a particular manner by an instrumentality to achieve the results set forth herein.

The coating itself is made up of a base or matrix material or bonding agent which may be considered to be a polymer and might be, for example, an epoxide polymer, unsaturated polyester (carboxylate-glycol adduct), a polyurethane, a polyamide or polyimide resin or the like. A particular polymer found to function particularly well as the matrix is an epoxy resin. Polyepoxides having an epoxy equivalent weight of between 140 and 525 e.g. between 170 and 290 are preferred. Polyepoxides having an average molecular weight below 1,200 (e.g. between 280 and 900) are also preferred. They also have a functionality i.e., ratio of molecular weight to epoxy equivalency) of at least one, preferably between 1.5 and 3.0. Suitable polyepoxides are polyepoxides formed from an epihalohydrin (for example epichlorhydrin) and a polyhydric compound e.g. bisphenol A [2,2-bis (4-hydroxyphenyl) propane] or glycerol. The preferred polyepoxide is the polyepoxide prepared by the reaction of an epihalohydrin e.g. epichlorohydrin with diphenylolpropane (bisphenol A) which has an epoxy equivalent weight of between 175 and 210, an average molecular weight of between 350 and 400 and an OH equivalency of about 1250. A thixotropic agent may be included and may be varied to suit the fluidity or viscosity in the arrangement shown and might, for example, be an asbestos.

The matrix or base material is indicated generally at 18 in FIG. 4 and includes two basic types of additives or particles, first a so-called secondary or co-abrasive filler, as at 20, which are smaller particles, and, second, the primary particles or fillers 22, which are larger and perform a primary abrasion resistant function.

The co-abrasive or secondary filler particles 20 are of a substantially smaller size than the primary particles 22. The smaller particles in a sense are randomly dispersed in and among the larger particles in the matrix so that they fill the voids or interstices between the primary particles. Their basic function is to protect the matrix from wear between the adjacent larger particles so that the larger particles will not be undermined by the matrix being eroded between them. The co-abrasive filler particles protect the polymer matrix, and in turn, stabilize the larger particles which perform the major or primary wear resisting function.

Typical examples of co-abrasive particles found to function particularly well in the wear-resistant coating for pipes of the type is silicon carbide which may be on the order of 180 mesh. Other fillers or secondary particles may be used and they should have a hardness at least as hard as the material that is being handled by the pipe. For example, they might be boron carbide, boron nitride, tungsten carbide, alumina ceramic, silica sand, taconite, technical grade or industrial diamond dust. It has been found that 180 mesh size is desirable, and they have also been found effective in certain situations in a range on the order of 225 to 100 mesh.

The primary abrasion resistant particles 22 may take different forms. For example, they might be alumina oxide, boron carbide, silicon carbide, technical grade or industrial diamond, a metal coated alumina ceramic particles of the type sold by Coors Porcelain Company of Golden, Colorado, under the trademark "METLX"

which is a high alumina (90% type) ceramic bead which has very fine grain (crystal) boundaries to give good abrasion resistance with a coating of metal on the surface thereof. Broadly, all such may be considered to be a ceramic or refractory. Instead of a bead, it may be in chip form. In any event, the large primary abrasion resistant particles should be of a size nominally 1/16" and may be considered to be a 16 mesh chip, but will function properly in certain applications in the range of from 36 to 8 mesh.

The matrix formula may be modified to include CTBN or ATBN rubber or bromine terminated polybutadiene to improve impact A specific example of a suitable composition for use in pipe lining may be:

| Resin Component | Parts by Weight |
|---|---|
| Polyepoxide | 100.00 |
| Silicon Carbide | 80.00 |
| Asbestos | 0.50 |
| Fumed Silica | 0.45 |
| | 180.95 |
| Hardener Component | Parts by Weight |
| Polyamine 37-610, Reichhold Chemicals, Inc. | 7.82 |
| Polyamine 37-622, Reichhold Chemicals, Inc. | 11.01 |
| Polyamidoamine 2341, Union Camp Corporation | 13.81 |
| Titanium Dioxide | 1.40 |
| | 34.04 |
| Primary Filler Component | Parts by Weight |
| Aluminum Oxide Chips, 12 mesh | 350.2 |

In the examples shown the formulation is a three-component mixture with the resin component being supplied through a tube or pipe 24 and the hardener component through an adjacent tube or pipe 26, both of which lead to a mixing head 28 of any suitable type where the two are thoroughly intermixed inside of the rotating pipe and the mixture discharged, as at 30, in a stream or free fall on the inner surface of the rotating pipe. It will be understood that the tubes and mixing head move axially relative to the pipe and may be supported by rollers 31 so that a smooth even coat is applied along the inner surface of the pipe. This is to say that the mixing head 28 may move from right to left in FIG. 2, as indicated by the arrow at the ends of the tubes 24 and 26. Or the pipe 10 may move from left to right. Or a combination. In any event, the resin and curing components are thoroughly intermixed so that the second co-abrasive filler completely permeates the matrix as it is applied along the inner surface of the pipe. Whereas the mixing head has been shown as being inside of the pipe and on the end of the supplying tubes, it should be understood that in certain situations all of the mixing may take place outside of the pipe with the completed mixture flowing in through a single or multipe tubes, as desired, and applied generally in the manner as shown. This is true of the particles as well as the matrix material.

A third tube or conveyor 32 supplies the third component, which is the primary filler and it will be noted that the point of introduction of the primary filler or large particles is spaced somewhat from the point where the matrix is deposited. Assuming that the mechanism 16 moves from right to left in FIG. 2, the matrix stream 30 will be applied first and after an interval, the primary particle stream 34 will deposit the large particles on the already curing matrix which will be of a certain viscosity or liquidity such that the primary particles will embed themselves in the matrix layer in random fashion and under the centrifugal force from the rotating pipe they will arrive at an intermediate position within the layer. The primary particles, when freed on the inner surface of the already applied matrix, have the ability or characteristic of seeking an open or unoccupied place between other such particles that have already embedded themselves or found their position, so to speak, and the result will be that the dispersion of the primary particles around the wear-resistant matrix will be unusually uniform without any bunching or clustering and of greatest density wear resistant particles.

As shown in FIG. 4, more than one layer may be applied. For example, a primary layer 36 may be initially applied with the primary particles embedding themselves therein and allowed to fully cure. Thereafter the process may be repeated so that a second or inner layer 38 is applied in the manner shown in FIG. 2 and then allowed to cure. And so forth, four such layers being shown in FIG. 4. And the number of layers that are applied will depend upon the particular application or use. In the diagrammatic showing in FIG. 2 it may be assumed that a second layer is in the process of being applied. The application of multilayers has many possibilities. For example, the first layer might be plain and function in the manner of a binder or primer, for example where the coefficient of expansion of the pipe is substantially different from that of the second layer. Also, the first layer might have big chips in it which would stick through the surface of the first layer and the small particles would not be included therein. Thereafter a second layer could be applied with the small particles in it which would fill in around the peak of the chips. This is to say that when multiple coats are being applied, they could be formulated for different purposes and the nesting concept mentioned above where the small particles fill in around the peaks of the large particles is merely one example.

Or it may be applied in one application or step depending upon the specific use and/or application. A suitable formulation for a one mixture application might be:

| Resin Component | Parts by Weight |
|---|---|
| Polyepoxide | 100.00 |
| Silicon Carbide | 80.00 |
| | 180.00 |
| Hardener Component | Parts by Weight |
| Polyamide 37-610, Reichhold Chemicals, Inc. | 7.82 |
| Polyamide 37-622, Reichhold Chemicals, Inc. | 11.01 |
| Primary Filler Component | Parts by Weight |
| Aluminum Oxide Chips, 36 mesh | 350.2 |
| Polyamidoamine 2341, Union Camp Corporation | 13.81 |
| | 32.64 |

The two components might be mixed either inside or outside of the pipe and applied in one step.

Additional examples of suitable compositions are set forth hereinbelow. In each it may be assumed that the matrix with the secondary filler or smaller particles is applied first and the primary or larger particles are applied second, in the general arrangement shown in FIG. 2. For example, a suitable composition for use in this invention is as follows:

| Resin Component | Parts by Weight |
|---|---|
| Polyepoxide | 100.00 |
| Silicon Carbide | 80.00 |
| Asbestos | 0.50 |
| Fumed Silica | 0.45 |
| | 180.95 |
| Hardener Component | Parts by Weight |
| Polyamine 37-610, Reichhold Chemicals, Inc. | 7.82 |
| Polyamine 37-622, Reichhold Chemicals, Inc. | 11.01 |
| Polyamidoamine 2341, Union Camp Corporation | 13.81 |
| Titanium Dioxide | 1.40 |
| | 34.04 |
| Primary Filler Component | Parts by Weight |
| Aluminum Oxide Chips, 36 mesh | 350.2 |

Another example of a suitable composition is as follows:

| Resin Component | Parts by Weight |
|---|---|
| Polyepoxide | 100.00 |
| Silicon Carbide | 80.00 |
| Asbestos | 0.50 |
| Fumed Silica | 0.45 |
| | 180.95 |
| Hardener Component | Parts by Weight |
| Polyamine 37-610, Reichhold Chemicals, Inc. | 7.82 |
| Polyamine 37-622, Reichhold Chemicals, Inc. | 11.01 |
| Polyamidoamine 2341, Union Camp Corporation | 13.81 |
| | 32.64 |
| Primary Filler Component | Parts by Weight |
| Aluminum Oxide Beads - 16 mesh | 350.2 |

Another example of a suitable composition is as follows:

| Resin Component | Parts by Weight |
|---|---|
| Polyepoxide | 100.00 |
| Silicon Carbide | 80.00 |
| Asbestos | 0.50 |
| Fumed Silica | 0.45 |
| | 180.95 |
| Hardener Component | Parts by Weight |
| Polyamine 37-610, Reichhold Chemicals, Inc. | 7.82 |
| Polyamine 37-622, Reichhold Chemicals, Inc. | 11.01 |
| Polyamidoamine 2341, Union Camp Corporation | 13.81 |
| | 32.64 |
| Primary Filler Component | Parts by Weight |
| Aluminum Oxide Chips - 20 mesh | 350.2 |

Another example of a suitable composition is as follows:

| Resin and Hardener Component | Parts by Weight |
|---|---|
| DER 664 Epoxy, Dow Chemical Co. | 100.00 |
| HY 939 Curative, Ciba-Geigy Corporation | 8.00 |
| Silicon Carbide - 180 mesh | 0.45 |
| Fumed Silica | 0.45 |

-continued

| | |
|---|---|
| Asbestos | 0.50 |
| | 188.95 |
| Primary Filler Component | Parts by Weight |
| Aluminum Oxide Chips - 12 mesh | 350.2 |

It will be noted that this last example is not a three-component composition, but rather only two. It might, for example, be applied and cured by heat, for example 2 hours at about 250° F. followed by an additional, say, 6 hours curing at 350° F. A two-component composition of this type would not need necessarily a mixing head, such as at 28 in FIG. 2, but might be applied through a single pipe with the primary abrasion resistant particles being applied thereafter in spaced relation to it.

An additional example of a two-part composition is as follows:

| Resin and Hardener Component | Parts by Weight |
|---|---|
| Epon 826, Shell Chemical Corp | 100.00 |
| Diamino diphenyl sulfone | 33.00 |
| Silicon Carbide | 80.00 |
| Fumed Silica | 0.60 |
| | 213.60 |
| Primary Filler Component | Parts by Weight |
| Aluminum Oxide 16 mesh beads | 350.2 |

In certain situations it may be advantageous and desirable to secure a more effective bond both between the matrix and the large particles and between the matrix and the inside of the pipe. And in such a situation a different series on set of compositions might be desirable. One such is as follows:

| Resin Component | Parts by Weight |
|---|---|
| Polyepoxide | 100.00 |
| Silicon Carbide | 80.00 |
| Asbestos | 0.50 |
| Fumed Silica | 0.45 |
| Epoxy Silane Coupling Agent | 0.50 |
| | 181.45 |
| Hardener Component | Parts by Weight |
| Polyamine 37-610, Reichhold Chemicals, Inc. | 7.82 |
| Polyamine 37-622, Reichhold Chemicals, Inc. | 11.01 |
| Polyamidoamine 2341, Union Camp Corporation | 13.81 |
| Titanium Dioxide | 1.40 |
| Amine Silane Coupling Agent | 0.25 |
| | 34.29 |
| Primary Filler Component | Parts by Weight |
| Aluminum Oxide Chips | 350.2 |

The same is true of the following example:

| Resin Component | Parts by Weight |
|---|---|
| Polyepoxide | 100.00 |
| Silicon Carbide | 30.00 |
| Asbestos | 0.50 |
| Fumed Silica | 0.45 |
| Epoxy Silane Coupling Agent | 0.50 |
| | 181.45 |
| Hardener Component | Parts by Weight |
| Polyamine 37-610, Reichhold Chemicals, Inc. | 7.82 |
| Polyamine 37-622, Reichhold Chemicals, Inc. | 11.01 |
| Polyamidoamine 2341, Union Camp | |

-continued

| | |
|---|---|
| Corporation | 13.81 |
| Amine Silane Coupling Agent | 0.25 |
| | 32.89 |
| Primary Filler Component | Parts by Weight |
| Aluminum Oxide Chips - 32 mesh | 350.2 |

The following example is also typical of the additional bonding to be gained between the matrix and both the primary particles and pipe:

| Resin Component | Parts by Weight |
|---|---|
| Polyepoxide | 100.00 |
| Silicon Carbide | 80.00 |
| Asbestos | 0.50 |
| Fumed Silica | 0.45 |
| Epoxy Silane Coupling Agent | 0.50 |
| | 181.45 |
| Hardener Component | Parts by Weight |
| Polyamine 37-610, Reichhold Chemicals, Inc. | 7.82 |
| Polyamine 37-622, Reichhold Chemicals, Inc. | 11.01 |
| Polyamidoamine 2341, Union Camp Corporation | 13.81 |
| Amine Silane Coupling Agent | 0.25 |
| | 32.89 |
| Primary Filler Component | Parts by Weight |
| Aluminum Oxide Chips - 16 mesh | 350.2 |

A variation on the above example is as follows:

| Resin Component | Parts by Weight |
|---|---|
| Polyepoxide | 100.00 |
| Silicon Carbide | 80.00 |
| Epoxy Silane Coupling Agent | 0.50 |
| | 180.50 |
| Hardener Component | Parts by Weight |
| Polyamine 37-610, Reichhold Chemicals, Inc. | 7.82 |
| Polyamine 37-622, Reichhold Chemicals, Inc. | 11.01 |
| Polyamidoamine 2340, Union Camp Corporation | 13.81 |
| Amine Silane Coupling Agent | 0.25 |
| | 32.89 |
| Primary Filler Component | Parts by Weight |
| Aluminum Dioxide Chips - 20 mesh | 350.2 |

As a further example of a two-component, instead of a three-component formulation, with improved bonding due to the inclusion of a coupling agent, the following is an example:

| Resin and Hardener Component | Parts by Weight |
|---|---|
| Der 664 Epoxy, Dow Chemical Co. | 100.00 |
| HY 939 Curative, Ciba-Geigy Corporation | 8.00 |
| Silicon Carbide - 180 mesh | 80.00 |
| Fumed Silica | 0.45 |
| Asbestos | 0.50 |
| Epoxy Silane Coupling Agent | 0.50 |
| | 189.45 |
| Primary Filler Component | Parts by Weight |
| Aluminum Oxide Chips - 12 mesh | 350.2 |

As a further variation on a two-component system, the following formulation is an example:

| Resin and Hardener Component | Parts by Weight |
|---|---|
| Epon 826, Shell Chemical Corporation | 100.00 |
| Diamino diphenyl sulfone, Ciba-Geigy Corporation | 33.00 |
| Silicon Carbide | 80.00 |
| Fumed Silica | 0.60 |
| Epoxy Silane Coupling Agent | 0.50 |
| | 214.10 |
| Primary Filler Component | Parts by Weight |
| Aluminum Oxide 16 mesh beads | 350.2 |

Factors to be taken into consideration in the preparation of any formulation is the desire to acquire uniform flow and a relatively fast gel time, since the applicatin of the resistant composition to the inner surface of the pipe is in essence a film application. In applying multiple layers, each layer may be a nominal 1/16 inch in thickness. If something on the order of a 12 mesh chip or bead is used as the primary particle, it may well protrude out of the coat when it contacts the inner surface of the pipe, but the next coat tends to mesh with it giving a nominal ⅛ inch coating for the two layers. Where the particles and matrix are mixed outside or inside and applied in one application, this might have advantage where the mass of the particles is not as efficient in centrifugal casting, for example where the large particles might be something on the order of 36 mesh. The pipe itself may be an epoxy style pipe, a polyester pipe, fiber glass, steel, aluminum, filament wound, pressure cast, vinyl ester, etc. Basically, no primer for the inner surface of the pipe is considered necessary or normally desirable and no special treatment should be involved prior to applying the first wearing layer. But with a particular material, for example a vinyl ester pipe, it may be desirable to use a preliminary primer such as a polymeric material. The combination pipe and coating may be cured in the ambient air or, in the event of cold weather or to accelerate the cure time, warm air may be blown down through the middle. At the same time, an infrared heat, such as a heat lamp or glow bar, may be applied to the inside or outside, or the pipe may be preheated. The particular heating means is not now considered critical and it might be dielectric radio frequency or inductionn heating, as well as ultraviolet in the case of a polyester matrix, or flash photolysis, etc.

While the preferred form and several variations of the inventive have been shown and described, it should be understood that suitable additional modifications, changes, substitutions and alterations may be made without departing from the invention's fundamental theme.

The embodiments of the invention in which an exclusive property or privilege is claimed are defined as follows:

1. A method of forming a wear-resistant pipe for use in the transmission of abrasive fluids, such as coal slurries and the like, including the steps of disposing the pipe about a generally horizontal axis and in a state to be rotated, providing a coating material which includes a cross-linkable thermosetting resin, a separate curing agent for the resin, and a separate source of abrasion-resistant particles, rotating the pipe about its horizontal axis at a rate of speed that will centrifuge the coating about the inside thereof, transporting the resin, the curing agent and the particles separately along the inside of the pipe out of contact therewith to a point of initial application adjacent one end of the pipe, mixing the resin and curing agent at a point of mixture inside the pipe to form a matrix, applying the matrix to the inside of the pipe progressively, commencing at the initial point of application, and while the pipe is being rotated, supplying the particles to the matrix at said initial point of application progressively and after the point of mixture where the matrix is initially formed, causing relative axial movement of the point of initial application progressively toward the other end of the pipe to thereby apply a uniform deposit of particles progressively with the matrix on the inner surface of the pipe, and allowing the mixture of matrix and particles to cure and adhere to the inner surface of the pipe to form a finished lined pipe product.

2. The method of claim 1 further characterized in that the particles supplied to the matrix include large abrasion-resistant particles and small coabrasion-resistant filler particles.

3. The method of claim 2 further characterized by and including the step of premixing the small coabrasion-resistant particles in the coating material prior to introduction of the large abrasion-resistant particles.

4. The method of claim 1 further characterized in that the abrasion-resistant particles are supplied to the matrix after the matrix has been supplied to the inside of the pipe so that the particles fall on and contact the inner surface of the matrix to disperse and individually embed themselves in random fashion in the coating.

5. A method of forming a wear-resistant pipe for use in the transmission of abrasive fluids, such as coal slurries and the like, including the steps of disposing a pipe about a generally horizontal axis and in a state to be rotated, providing a three-component coating material which includes a cross-linkable thermosetting resin, a separate curing agent for the resin, and abrasion-resistant particles, rotating the pipe about its horizontal axis at a rate of speed that will centrifuge the coating material about the inside thereof, transporting the three components separately along the inside of the pipe out of contact therewith to a point of mixture adjacent one end of the pipe, mixing the resin and curing agent at the point of mixture to form a matrix without intermixing the particles therewith, applying the matrix to the inside of the pipe while it is being rotated, adding the particles to the matrix after the point of mixture where the matrix is initially formed, causing relative axial movement of the point of application toward the other end of the pipe to thereby apply a uniform coating of matrix and particles on the inner surface thereof, and allowing the mixture of matrix and particles to cure and adhere to the inner surface of the pipe to form a finished lined pipe product.

6. The method of claim 5 further characterized by and including the step of applying mixture to the inside of the pipe progressively, commencing at the initial point of application, and while the pipe is being rotated, supplying the particles to the matrix at said initial point of application progressively and after the point of mixture where the matrix is initially formed.

7. The method of claim 1 further characterized in that the pipe is made of a fiber glass reinforced polymer.

* * * * *